(12) United States Patent
Morgan

(10) Patent No.: US 11,286,040 B2
(45) Date of Patent: Mar. 29, 2022

(54) ACTUATOR SYSTEM

(71) Applicant: Goodrich Actuation Systems Limited, Solihull (GB)

(72) Inventor: Antony Morgan, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 378 days.

(21) Appl. No.: 16/411,567

(22) Filed: May 14, 2019

(65) Prior Publication Data

US 2020/0055590 A1 Feb. 20, 2020

(30) Foreign Application Priority Data

Aug. 20, 2018 (EP) .................................... 18275127

(51) Int. Cl.
*B64C 13/50* (2006.01)
*B64D 45/00* (2006.01)
*B64C 13/28* (2006.01)

(52) U.S. Cl.
CPC .......... *B64C 13/506* (2018.01); *B64C 13/341* (2018.01); *B64D 45/00* (2013.01); *B64D 2045/0085* (2013.01)

(58) Field of Classification Search
CPC ..... B64C 13/34; B64C 13/341; B64C 13/506; F16H 2061/1224; B64D 45/00; B64D 45/0005; B64D 2045/001; B64D 2045/0085
See application file for complete search history.

(56) References Cited

U.S. PATENT DOCUMENTS

| | | | |
|---|---|---|---|
| 3,935,754 A | 2/1976 | Comollo | |
| 4,256,277 A | 3/1981 | Embree | |
| 4,779,490 A * | 10/1988 | Milunas | F16H 59/36 477/115 |
| 4,779,822 A | 10/1988 | Burandt et al. | |
| 4,909,364 A | 3/1990 | Grimm | |

(Continued)

FOREIGN PATENT DOCUMENTS

GB 2126177 A 3/1984

OTHER PUBLICATIONS

Extended European Search Report for International Application No. 18275127.1 dated Feb. 4, 2019, 5 pages.

*Primary Examiner* — Richard R. Green
*Assistant Examiner* — William L Gmoser
(74) *Attorney, Agent, or Firm* — Cantor Colburn LLP

(57) ABSTRACT

An actuator system for controlling a movable surface has a main shaft connected between a power drive unit and the movable surface to transmit a command from the power drive unit to move the movable surface. If a failure in the main shaft is detected a failure control device connects a secondary shaft from the movable surface to the power drive unit e.g. by releasing a solenoid which releases gears so as to permit differential rotations between an outer ring and a sun gear of a planetary gear system, within prescribed limits. When these limits are exceeded, the solenoid brake is de-energised braking the planetary gear outer ring and tying the gears through an epicycle ratio corresponding to the ratio of gears connecting the main and secondary shafts. The gear system acts as a low mass asymmetry brake that allows post-failure operation of the surface control.

10 Claims, 2 Drawing Sheets

(56) References Cited

U.S. PATENT DOCUMENTS

| | | | |
|---|---|---|---|
| 5,957,798 A * | 9/1999 | Smith, III | B64C 13/34 475/5 |
| 9,604,717 B2 | 3/2017 | Coffman | |
| 9,809,301 B2 | 11/2017 | Chavignier et al. | |

* cited by examiner

ACTUATOR SYSTEM

FOREIGN PRIORITY

This application claims priority to European Patent Application No. 18275127.1 filed Aug. 20, 2018, the entire contents of which is incorporated herein by reference.

TECHNICAL FIELD

The present disclosure relates to an actuator system for controlling an aircraft moveable control surface.

BACKGROUND

In aircraft, moveable surfaces are provided on e.g. the wings and tail, as flaps or slats or ailerons. These are controlled to extend, retract, lift and lower such that the flow of air across those surfaces is changed which modifies the flight behaviour of the aircraft. Such flight control surfaces are used in particular during take-off and landing, e.g. during landing, the high lift flaps and/or slats are lowered/extended to ensure sufficient lift at slower speeds. Sometimes, e.g. in military aircraft and during in-flight refuelling, the aircraft is required to reduce speed, where the flaps and/or slats are also lowered/extended. Also during high speed, supersonic flight the flaps and/or slats provide the main pitch control of the flight of the aircraft. The slat and flap systems generally have multiple high force/torque actuators driven by a single high speed shaft system under control of a single drive unit. Ailerons are surfaces provided at the end of the aircraft wings to allow control of the roll of the aircraft.

Other moveable surfaces, e.g. weapon bay door systems, are also controlled by actuator systems having multiple high force/high torque actuators with large ratios driven by a single high speed shaft system under control of a single drive unit.

Control of these surfaces is generally by means of hydraulic and/or pneumatic powered actuation systems or, as there is a trend to more electric aircraft (MEA), by electric actuation systems. Many applications use multiple actuator systems whereby several actuators are provided in series along a main shaft between a power drive unit (PDU) and the control surface.

Problems can arise if there is a failure at some point on the main shaft between the PDU and the control surface. With multiple actuator systems, there are more possible points of failure. If an actuator along the main shaft fails, the control surface and the main shaft beyond the point of failure may run in an uncontrolled manner meaning that flight is uncontrolled. There is also an imbalance between the two sides of the aircraft.

Whilst such loss of control is always a serious problem in aircraft, this may be less catastrophic for civilian aircraft which tend to use high lift flight control surfaces only during take-off and landing/taxiing. In military aircraft, however, flight manoeuvres are performed by adjusting high lift flight control surfaces and failure would, therefore, be mission critical. Aircraft also rely on flight control surfaces during transonic and supersonic flight. Similarly, the stall control of the aircraft is controlled by adjustment of high lift flight control surfaces during in-flight refuelling and, again, the consequences of failure in such a situation would be mission critical, possibly catastrophic.

Conventionally, the safety mechanism provided for such situations has been a brake mechanism provided at the flight control surface end of the main shaft. A comparison is made between the commanded degree of rotation at the PDU end and the actual rotation/position at the flight control surface end. A fault would be indicated if the actual position/rotation does not match (or is out by more than a threshold amount of) the commanded position/rotation. The system would then apply the brake to stop free movement of the flight control surface and would also lock the PDU to prevent further operation. Control of the other wing is also necessary to avoid undesired movement of the aircraft that the pilot may be unable to quickly react to. Whilst this mechanism prevents free spinning of the flight control surface end, it also means that there is no longer any flight control by the flight control surface—i.e. the flight control by means of the surfaces is disabled.

There is a need for systems which are able to detect, react to and tolerate such faults, particularly in a multi-actuator system, whilst maintaining some degree of control of the aircraft flight and position by means of the flight control surface(s).

SUMMARY

The present disclosure provides, in one aspect, an actuator system for moving a moveable surface, the system comprising: a power drive unit to provide a command to move the moveable surface; a main drive shaft connected at a first end to the power drive unit, the second end of the main drive shaft being arranged to connect, in use, the moveable surface, the main drive shaft transmitting the command from the power drive unit to the moveable surface in the form of rotation of the main drive shaft; a plurality of actuators along the main driveshaft between the first end and the second end of the main drive shaft, via which the command is transmitted to the moveable surface; the actuator system further comprising a secondary drive shaft having a first end connectable to the power drive unit via a failure control device and a second end connected to the second end of the main drive shaft via a gear arrangement; the failure control device comprising means for identifying a failure between the first end and the second end of the main drive shaft and, in response thereto, means for causing the secondary drive shaft to be connected to the power drive unit such that the command is transmitted to the moveable surface via the secondary drive shaft as rotation of the secondary shaft.

According to another aspect, there is provided a method of moving a moveable surface in response to a command from a power drive unit, wherein the command is transmitted to move the moveable surface via a plurality of actuators provided along a main drive shaft connected at a first end to the power drive unit, the command in the form of rotation of the main drive shaft; the method further comprising monitoring rotation of speed or position of the main drive shaft to identify a failure along the main drive shaft and, in response thereto, causing a secondary drive shaft to be connected to the power drive unit such that the command is transmitted to the moveable surface via the secondary drive shaft in the form of rotation of the secondary shaft.

DETAILED DESCRIPTION

Figure 1:
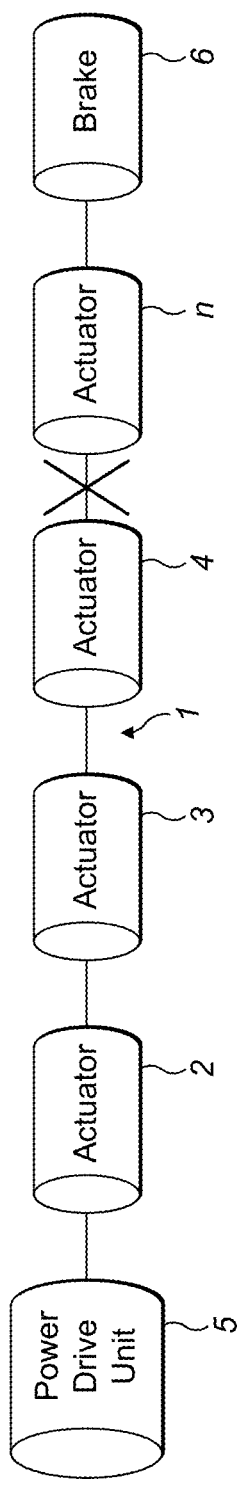
FIG. 1 is a schematic diagram of a conventional multi-actuator control system.

A conventional multi-actuator control system will be briefly described with reference to FIG. 1. The control to a moveable surface (not shown) is provided along a main shaft 1, along which several actuators 2, 3, 4, n are provided in series. The actuators are commanded from a power drive unit, PDU 5, at an end of the main shaft 1 opposite to the end where the moveable surface is provided. In the event of a failure along the main shaft between the PDU and the moveable surface (indicated here by way of example as X) actuators n beyond the failure point with respect to the PDU and/or the control surface will run in an uncontrolled manner. To stop this uncontrolled free running, a brake 6 is actuated to stop the free running actuator(s) n and the power drive unit 5 is blocked thus also stopping the actuators 2,3,4 connected to it on the main shaft 1.

The detection of the failure may be e.g. by means of a comparison of the rotational position of the main shaft at the PDU end—i.e. the desired or commanded position—and the rotational position at the other end. If there is a difference, or, preferably a difference above a given threshold value, a failure is indicated.

Once applied, the brake 6 remains applied until the end of the flight whereupon it can be e.g. manually released. This means that for the rest of the flight there is no possibility of controlling flight/door movement etc. by means of the movable control surface.

Figure 2:
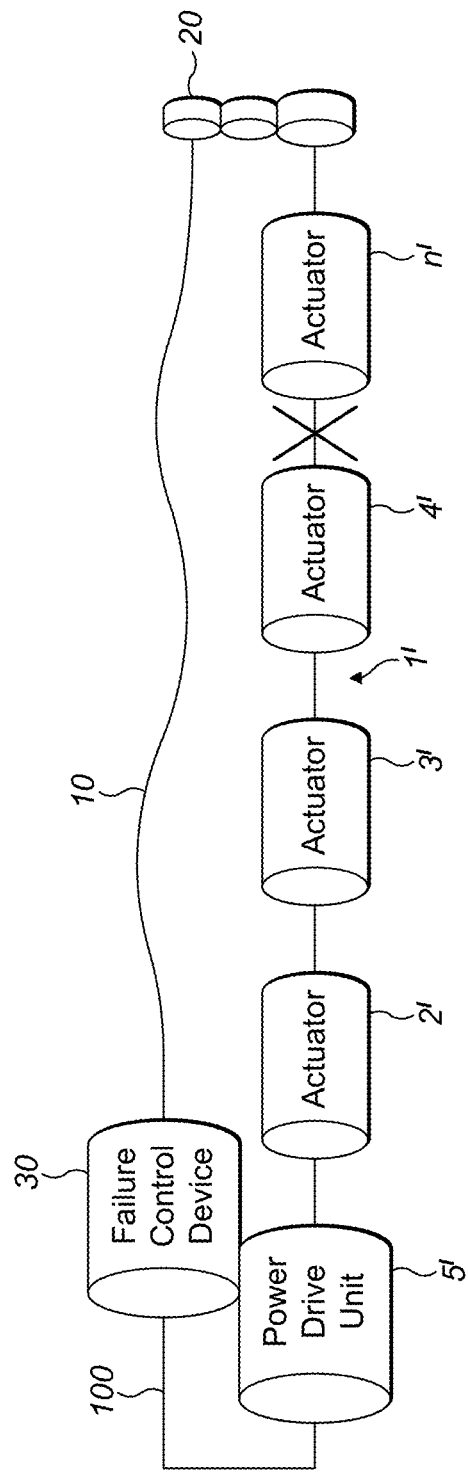
FIG. 2 is a schematic diagram of a multi-actuator control system according to this disclosure.

The system presented in this disclosure provides an alternative solution in the form of, as shown in FIG. 2, a secondary shaft 10 running essentially alongside the main shaft between the PDU 5' and the moveable surface (not shown). As with known systems such as shown in FIG. 1, the PDU is, in normal operation, connected to the moveable surface (not shown) via multiple actuators 2', 3', 4', n' along the main shaft 1'. The secondary shaft 10 connects the PDU to the moveable surface via a gear box 20 that connects the main shaft to the secondary shaft so as to allow the secondary shaft 10 to operate at a higher speed. In normal operation, the secondary shaft is unloaded i.e. no or very little torque is applied to the secondary shaft 10. The gear box ratio is selected such that the rotation of the main shaft causes rotation of the secondary shaft, via the gear box, but at a higher speed and lower torque than the main shaft. In one example, the main shaft runs at between 400 and 1000 rpm with medium to high torque. The secondary shaft 10 runs about three times faster.

The secondary shaft 10 is preferably a flexible strong cable e.g. with a 20 mm outside diameter. Such a structure is preferred only, but is able to easily fit into existing structures and fit around other existing structures without adding to the size of the overall system.

In the event of a failure on the main shaft (shown by way of example as X), a failure control device 30 detects the failure and connects the secondary shaft to the PDU 5'. This initially acts to restrain or prevent any free running of the end of the main shaft that is beyond the failure point, with respect to the PDU, but, in addition, provides a shaft connection from the PDU 5' to the moveable surface, bypassing the failure point, allowing the PDU 5' to continue to drive the actuators, via the gear box 20. This control operates at a lower speed than in normal operation but at least still allows some control of the moveable surface, thus allowing some control of the flight of the aircraft/operation of the weapon bay door etc.

Figure 3:
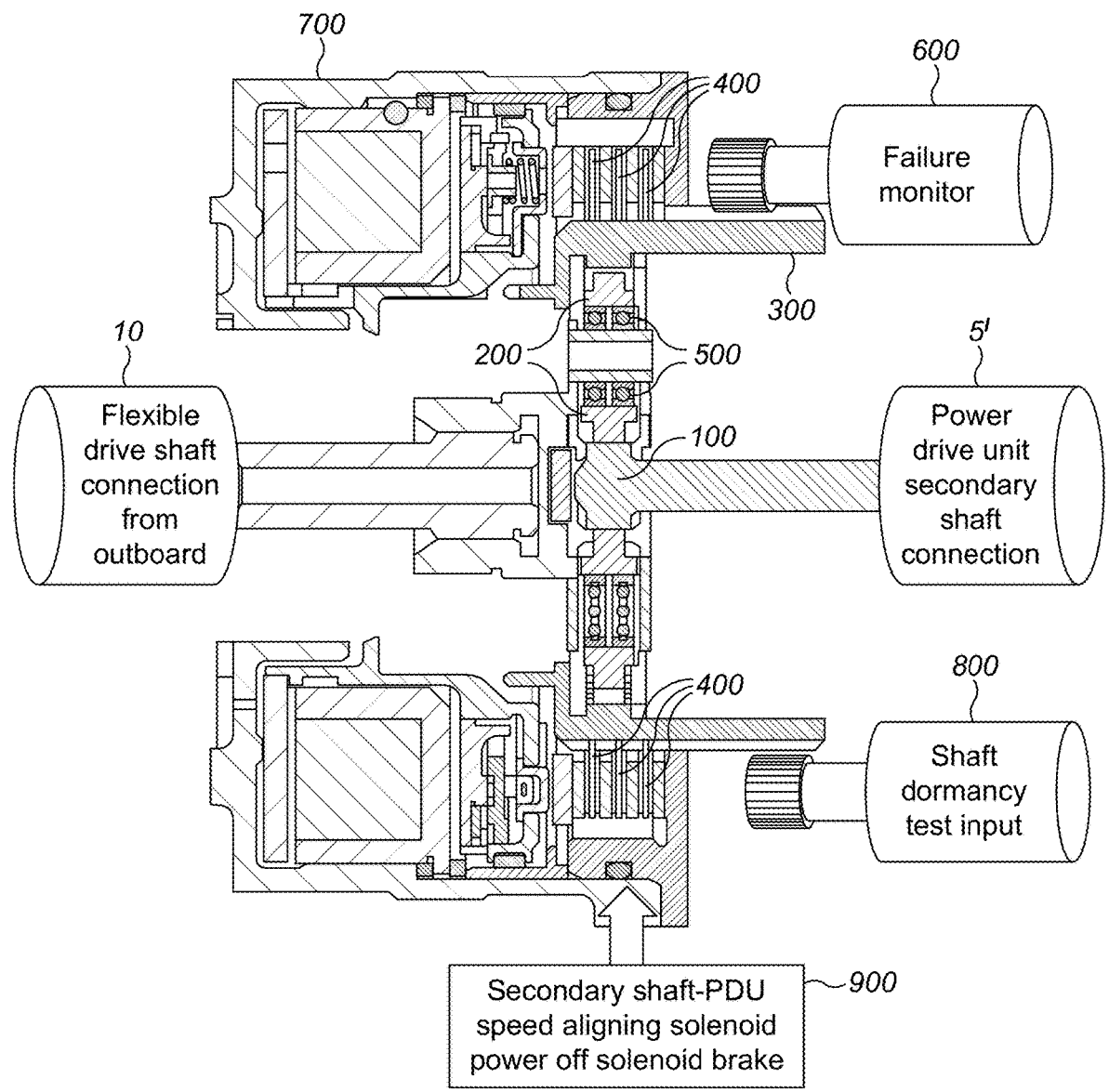
FIG. 3 is a detailed sectional view of a failure control mechanism for the actuator system according to the disclosure.

A preferred embodiment of the failure control device of the secondary shaft system will now be described in more detail with reference to FIG. 3.

The secondary shaft 10 is preferably provided with an epicyclic gear arrangement comprising a sun gear 100 driven by the PDU, which, in turn, drives a number of planetary gears 200 via bearings 500. The planetary gears 200 mesh with the sun gear 100 and with an outer ring 300. Because the outer ring 300 is rotated via the gear arrangement, driven by rotation of the sun gear, driven by the PDU, the relative rotational speed of the outer ring depends on the relative speeds of the sun gear 100, the secondary shaft 10 and the choice of numbers of gear teeth (not shown) between the sun gear, planetary gears and outer ring.

The outer ring 300 is splined to a set of brake plates 400. In normal operation these plates hold the outer ring against rotation e.g. by means of a spring load. During movement of the high lift surfaces the brake plates are forced out of braking engagement allowing the outer ring to rotate. In one example, the brake plates are spring loaded such that they are biased in the brake state i.e. so that they press tightly against the splines of the outer ring to prevent rotation. They are activated by means of e.g. a solenoid or hydraulic device such as a piston out of brake engagement—e.g., by depressing or compressing the spring loading so as to release the splines.

The gear tooth configuration of the planetary gear system 100, 200 is selected so as to match the ratio of the gearbox 20 between the primary shaft 1' and the secondary shaft 10.

Where there are no failures in the primary shaft, because of the matching gear ratios between the planetary gear system 100, 200 in the secondary shaft gear arrangement and the gearbox 20, the epicycle gear ratio is adhered to and there will be no relative rotation of the outer ring 300 i.e. the rotation of the outer ring matches the desired rotation input from the power drive unit 5'. The failure control device 30 therefore determines that the rotation of the second end of the main shaft corresponds to the power drive unit commanded rotation at the first end, as this is transmitted back to the failure control device via the gear box 20, the secondary shaft 10 and the planetary gear mechanism 100, 200.

In the event of a failure in the main shaft 1', the second end rotation does not match the first end and so the gear ratio within the secondary shaft gear assembly will no longer match that of the gearbox 20, and the outer ring 300 will rotate.

A failure monitor 600 monitors the angular position and/or rotation speed of the outer ring (300). If the angular rotation of the outer ring 300 exceeds a predetermined threshold amount, due to the failure mentioned above, the failure monitor determines that there is a failure in the main shaft 1' and controls the solenoid/hydraulic brake system 700 to activate the brake plates 400 to decelerate and brake the outer ring 300 against further rotation. This braking clamps rotation of the outer ring 300 and, thus, the secondary shaft 10 to the rotation of the power drive unit 5' via the sun gear 100. The power drive unit 5' is thereby connected to the moveable surface e.g. at the wing tip via the secondary shaft. This allows the system to continue to control movement of the movable surface in accordance with the PDU output. The power transmitted will be less than that of the multiple actuators of the main shaft, but will still enable flight control to continue.

In summary, in the preferred embodiment, if a failure in the main shaft is detected—e.g. based on comparing rotational angles between the PDU end of the main shaft 1' and the other end of the main shaft and identifying a failure in the event of the difference in rotational positions exceeding a predetermined threshold—the failure control device 30 activates a solenoid 900 which releases the gears so as to permit differential rotations between the outer ring 300 and the sun gear (60) of the planetary gear system, within prescribed limits. When these limits are exceeded, the solenoid/hydraulic brake is deenergised braking the planetary gear outer ring and tying the gears through the epicyclic ratio. The gear system acts as a low mass asymmetry brake that allows post-failure operation of the surface control.

A shaft dormancy test device 800 may also be provided to test for fatigue over the life of the flexible secondary shaft 10. If this device 800 is able to rotate, it is an indication that there has been a failure in either the secondary shaft or the main shaft torque path.

The invention claimed is:

1. An actuator system for moving a moveable surface, the system comprising:
   a power drive unit to provide a command to move the moveable surface;
   a main drive shaft operably connected at a first end to the power drive unit, the second end of the main drive shaft being arranged to connect, in use, to the moveable surface, the main drive shaft transmitting the command from the power drive unit to the moveable surface in the form of rotation of the main drive shaft;
   a plurality of actuators along the main driveshaft between the first end and the second end of the main drive shaft, via which the command is transmitted to the moveable surface;
   the actuator system further comprising a secondary drive shaft having a first end connectable to the power drive unit via a failure control device and a second end connected to the second end of the main drive shaft via a gear arrangement;
   the failure control device comprising means for identifying a failure between the first end and the second end of the main drive shaft and, in response thereto, means for causing the secondary drive shaft to be connected to the power drive unit such that the command is transmitted to the moveable surface via the secondary drive shaft as rotation of the secondary shaft;
   wherein the failure control device comprises:
   a planetary gear system comprising a sun gear connected for rotation by the power drive unit;
   a planetary gear in meshing gear connection with the sun gear; and
   an outer ring in meshing gear connection with the planetary gear;
   wherein, in normal operation, when there is no failure between the first and second ends of the main shaft, rotation of the outer ring with respect to rotation of the sun gear corresponds to rotation of the second end of the main shaft with respect to rotation of the first end of the main shaft and the secondary shaft is not connected to the power drive unit via the planetary gear system.

2. The actuator system of claim 1, wherein the means for causing the secondary drive shaft to be connected to the power drive unit comprises means for detecting whether there is a difference between rotation of speed or position of the first end of the main drive shaft and rotation of speed or position of the second end of the main drive shaft that exceeds a predetermined threshold.

3. The actuator system of claim 2, wherein the means for determining the difference is configured to detect a difference in rotational position of the first end of the secondary drive shaft and the second end of the main drive shaft.

4. The actuator system of claim 1, wherein the means for identifying a failure comprises means for comparing a rotational speed or position of the outer ring with respect to a rotational speed and/or position of the first end of the main shaft and determining if any difference exceeds a predetermined threshold.

5. The actuator system of claim 4, wherein if the means for comparing determines that the difference exceeds the predetermined threshold, the failure control device is configured to actuate a braking mechanism configured to brake rotation of the outer ring relative to rotation of the sun gear thus connecting the secondary shaft to the power drive unit to rotate with the sun gear.

6. The actuator system of claim 5, wherein the braking mechanism comprises a solenoid brake.

7. The actuator system of claim 5, wherein the braking mechanism comprises an hydraulic brake.

8. The actuator system of claim 5, wherein the brake mechanism comprises a plurality of plates or clamps that brake the outer ring relative to the sun gear on operation of the brake.

9. The actuator of claim 1, wherein the secondary drive shaft is a flexible shaft.

10. A flap control arrangement for moving a flap of an aircraft comprising:
    the actuator system of claim 1; and
    the movable surface, the movable surface being a wing or tail flap of an aircraft.

* * * * *